United States Patent
Choi et al.

(10) Patent No.: US 11,205,363 B2
(45) Date of Patent: Dec. 21, 2021

(54) ELECTRONIC DISPLAY CROSS-TALK COMPENSATION SYSTEMS AND METHODS

(71) Applicant: Apple Inc., Cupertino, CA (US)

(72) Inventors: Myungjoon Choi, San Jose, CA (US); Kingsuk Brahma, Mountain View, CA (US); Li-Xuan Chuo, Cupertino, CA (US); Mohammad Ali Jangda, Santa Clara, CA (US); Hyunsoo Kim, Mountain View, CA (US); Hyunwoo Nho, Palo Alto, CA (US); Alex H. Pai, Milpitas, CA (US); Jesse Aaron Richmond, San Francisco, CA (US); Jie Won Ryu, Santa Clara, CA (US); Shiping Shen, Cupertino, CA (US); Chaohao Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/016,282

(22) Filed: Sep. 9, 2020

(65) Prior Publication Data
US 2021/0118349 A1  Apr. 22, 2021

Related U.S. Application Data

(60) Provisional application No. 62/923,373, filed on Oct. 18, 2019.

(51) Int. Cl.
*G06F 3/046* (2006.01)
*H04B 3/32* (2006.01)
*G09G 3/20* (2006.01)
*G06F 3/044* (2006.01)

(52) U.S. Cl.
CPC .............. *G09G 3/20* (2013.01); *G06F 3/0443* (2019.05); *G09G 2320/0209* (2013.01)

(58) Field of Classification Search
None
See application file for complete search history.

(56) References Cited

U.S. PATENT DOCUMENTS

| | | |
|---|---|---|
| 7,091,945 B2 | 8/2006 | Yamazaki |
| 7,327,358 B2 | 2/2008 | Tajiri et al. |
| 9,310,916 B2 | 4/2016 | Krah |

(Continued)

FOREIGN PATENT DOCUMENTS

| | | |
|---|---|---|
| KR | 100481220 B1 | 4/2005 |
| KR | 20150002202 A | 1/2015 |

*Primary Examiner* — Duane N Taylor, Jr.
(74) *Attorney, Agent, or Firm* — Fletcher Yoder P.C.

(57) ABSTRACT

An electronic display may include pixel circuitry to display an image based on image data compensated for voltage variations within the pixel circuitry. Image processing circuitry may generate a compensation value to compensate the image data for cross-talk (e.g., electromagnetic coupling between an electrode of touch sensor circuitry and an electrode of the pixel circuitry) that may cause the voltage variations. Additionally or alternatively, the image processing circuitry may generate another compensation value to compensate the image data for another cross-talk (e.g., electromagnetic coupling between two electrodes of the pixel circuitry). The image processing circuitry may generate the compensated image data based on the first compensation value and/or the second compensation value.

9 Claims, 11 Drawing Sheets

(56) References Cited

U.S. PATENT DOCUMENTS

| | | | |
|---|---|---|---|
| 9,335,870 B2 | 5/2016 | Yousefpor et al. | |
| 10,503,292 B2 * | 12/2019 | Shang | G06F 3/04184 |
| 2010/0079402 A1 * | 4/2010 | Grunthaner | G06F 3/0443 |
| | | | 345/174 |
| 2016/0147319 A1 * | 5/2016 | Agarwal | G06F 3/0418 |
| | | | 345/173 |
| 2018/0239493 A1 * | 8/2018 | Khazeni | G06F 3/0443 |

* cited by examiner

ELECTRONIC DISPLAY CROSS-TALK COMPENSATION SYSTEMS AND METHODS

CROSS-REFERENCE TO RELATED APPLICATIONS

This application claims the benefit of U.S. Provisional Application No. 62/923,373, "ELECTRONIC DISPLAY CROSS-TALK COMPENSATION SYSTEMS AND METHODS," filed Oct. 18, 2019, which is herein incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In general, the display of an electronic device may be compactly packaged with other components, for example, to reduce the size of the overall electronic device and/or allow space for additional components. Additionally, the density of pixels in the display may be increased for increased resolution and fidelity. However, the close proximity of electrical signals routed to and from the various components of the electronic device, including the pixels, may result in "cross-talk" (e.g., parasitic capacitance, current leakage, voltage variations, and other forms of electromagnetic interference) within the pixel circuitry (e.g., data lines, reference voltage lines, etc.) and/or between the pixel circuitry and other components of the electronic device, such as touch sensor circuitry. Such cross-talk may lead to variations in luminance of the pixels, which may manifest as perceivable artifacts on the display. The present disclosure generally relates to systems and methods for compensating the image data sent to the pixels of an electronic display for cross-talk within the pixel circuitry and/or between the pixel circuitry and the touch sensor circuitry. This may counteract the effect of cross-talk before the image data even reaches the display.

For example, in some embodiments, a touch stimulus signal may be employed in the touch sensor circuitry to facilitate detecting a user input (e.g., a finger or stylus touching the electronic device) and/or determining the placement of the user input relative to the electronic display. However, the touch stimulus signal may cross-talk with the pixel circuitry causing variations in the luminance output of the pixels. In some embodiments, the electronic device may compensate the image data to the pixels based on the frequency of the touch stimulus signal and/or the location of the pixels on the display panel. The compensation to the image data may increase or decrease the voltage of the data signal sent to a pixel to counter the cross-talk from the touch sensor circuitry (e.g., the touch stimulus signal).

Additionally or alternatively, cross-talk may occur between data lines, reference lines, or other conductive lines within the pixel circuitry. For example, a reference voltage (e.g., VDDEL or VSSEL) of the pixels may cross-talk with one or more data line voltage signals of the pixels causing the difference between the reference voltage and the data line voltage signal of a given pixel and, therefore, the apparent applied signal to the pixel to increase or decrease. In some embodiments, the electronic device may counter the cross-talk between the conductive lines within the pixel circuitry by anticipating an increase or decrease to the reference voltage and adjusting the image data accordingly to maintain the desired apparent applied signal (e.g., associated with the image data) to the pixel. Moreover, in some embodiments, the anticipated change in the reference voltage may be determined based on the aggregate of multiple pixel transitions (e.g., changes in the data line voltage signal from one row of pixels to the next).

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
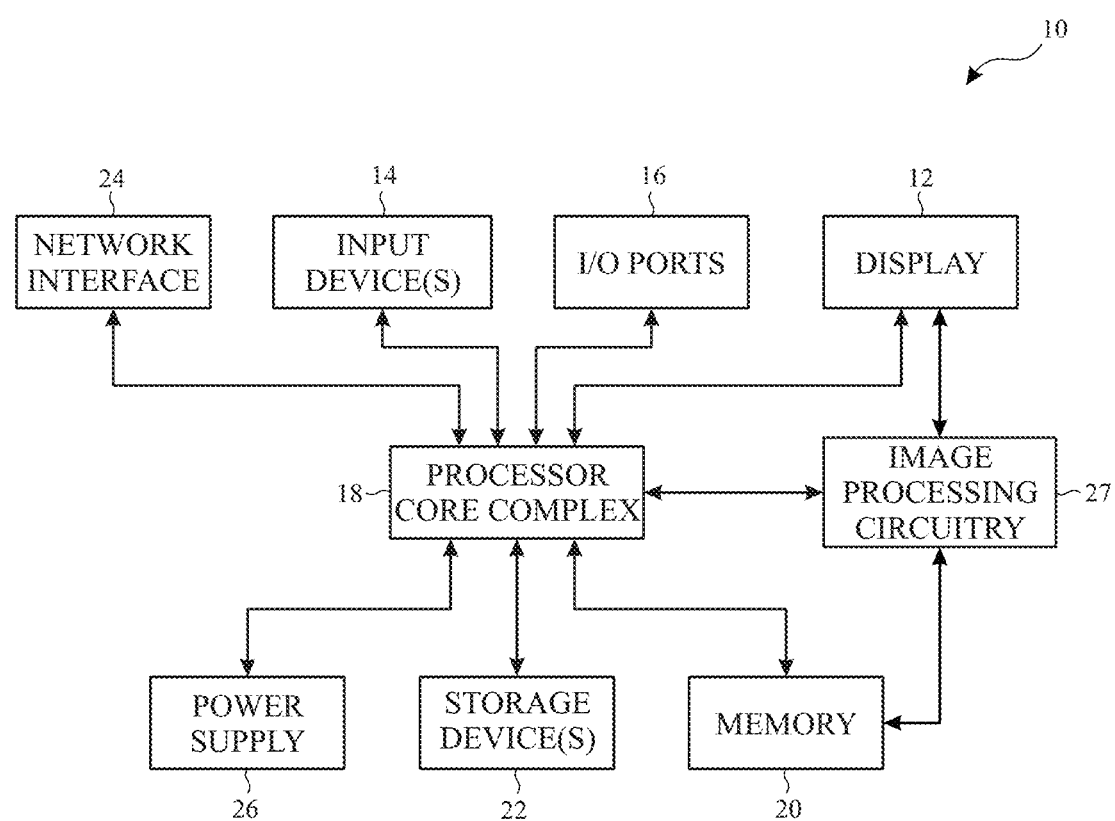
FIG. 1 is a block diagram of an electronic device including an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Numerous electronic devices—including televisions, portable phones, computers, wearable devices, vehicle dashboards, virtual-reality glasses, and more—display images on an electronic display. As electronic displays gain increasingly higher pixel density (e.g., for higher resolution) and/or are more compact (e.g., thinner), they may also become increasingly more susceptible to image display artifacts due to cross-talk between electrical signals within the electronic device. Indeed, the close proximity of electrical signals routed to and from the various components of the electronic device, including the pixels, may result in cross-talk such as parasitic capacitance, current leakage, voltage variations, and other forms of electromagnetic interference. The cross-talk may occur within the pixel circuitry (e.g., data lines, reference voltage lines, etc.) and/or between the pixel circuitry and other components of the electronic device, such as touch sensor circuitry. Such cross-talk may lead to variations in luminance of the pixels, which may manifest as visual artifacts on the display.

In some embodiments, in some embodiments, a touch stimulus signal may be employed in the touch sensor circuitry to facilitate detecting a user input (e.g., a finger or stylus touching the electronic device) and/or determining the placement of the user input relative to the electronic display. However, the touch stimulus signal may cross-talk with the pixel circuitry causing variations in the luminance output of the pixels. In some embodiments, the electronic device may compensate the image data to the pixels based on the frequency of the touch stimulus signal and/or the location of the pixels on the display panel. The compensation to the image data may increase or decrease the voltage of the data signal sent to a pixel to counter the cross-talk from the touch sensor circuitry (e.g., the touch stimulus signal).

Additionally or alternatively, cross-talk may occur between data lines, reference lines, or other conductive lines within the pixel circuitry. For example, a reference voltage (e.g., VDDEL or VSSEL) of the pixels may cross-talk with one or more data line voltage signals of the pixels causing the difference between the reference voltage and the data line voltage signal of a given pixel and, therefore, the apparent applied signal to the pixel to increase or decrease. In some embodiments, the electronic device may counter the cross-talk between the conductive lines within the pixel circuitry by anticipating an increase or decrease to the reference voltage and adjusting the image data accordingly to maintain the desired apparent applied signal (e.g., associated with the image data) to the pixel. Moreover, in some embodiments, the anticipated change in the reference voltage may be determined based on the aggregate of multiple pixel transitions (e.g., changes in the data line voltage signal from one row of pixels to the next).

In some embodiments, compensation of the image data for the pixel circuitry cross-talk and/or touch sensor cross-talk may be accomplished within image processing circuitry (e.g., a display pipeline) before being sent to a display driver of the electronic display and/or within the electronic display. In other words, image processing for the compensation of cross-talk may be accomplished within a display pipeline, at the display driver, or at any suitable point in the flow of image data from an image data source to the pixel to reduce the likelihood of perceivable artifacts (e.g., banding, color or luminance variations, etc.) on the electronic display.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processors or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit, a display image processing pipeline) may be included in the processor core complex 18, the electronic display 12, or include standalone circuitry.

As depicted, the processor core complex 18 is operably coupled with local memory 20 and the main memory storage device 22. In some embodiments, the local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may be communicatively coupled to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor core complex 18 and/or other components in the electronic device 10 such as the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12). As should be appreciated, touch sensor circuitry may be integrated into the electronic display 12 or be implemented as a separate "layer" of circuitry on the surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels that each control the luminance of one color component (e.g., red, blue, or green). As should be appreciated, a pixel may include any suitable grouping of sub-pixels such as red, blue, green, and white (RBGW), or other color sub-pixel, and/or may include multiple of the same color sub-pixel. For example, a pixel may include one blue sub-pixel, one red sub-pixel, and two green sub-pixels (GRGB). As used herein for simplicity, the term "pixel" may generally refer to a single sub-pixel or grouping of sub-pixels.

As described above, the electronic display 12 may display an image by controlling luminance of the pixels based at least in part on corresponding image data. In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
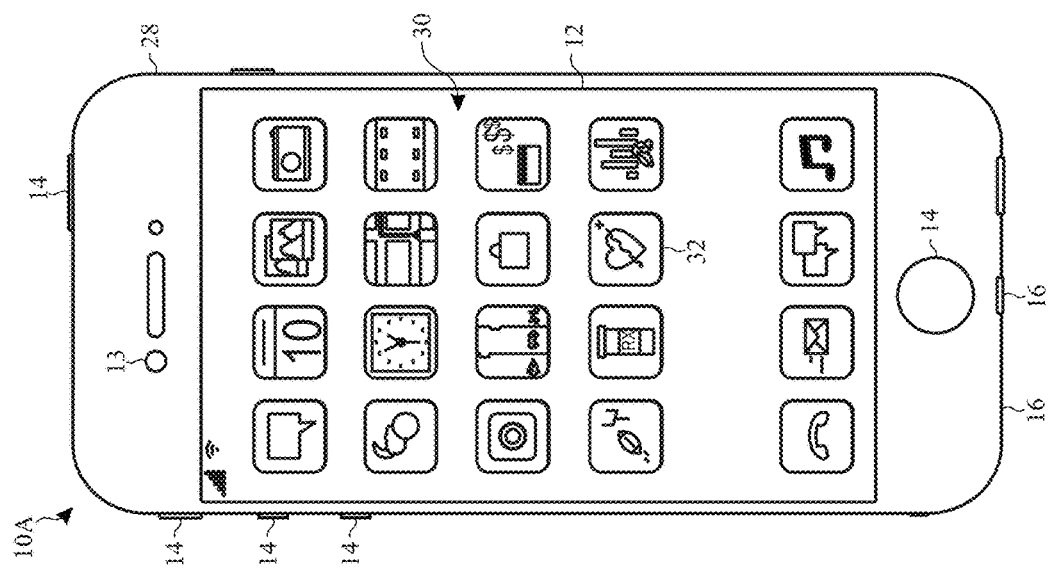
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 may surround and/or provide a structural frame for the electronic display 12. In the depicted embodiment, the electronic display 12 is displaying a graphical user interface (GUI) 30 having an array of icons 32. By way of example, when an icon 32 is selected either by an input device 14 or touch sensor circuitry of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
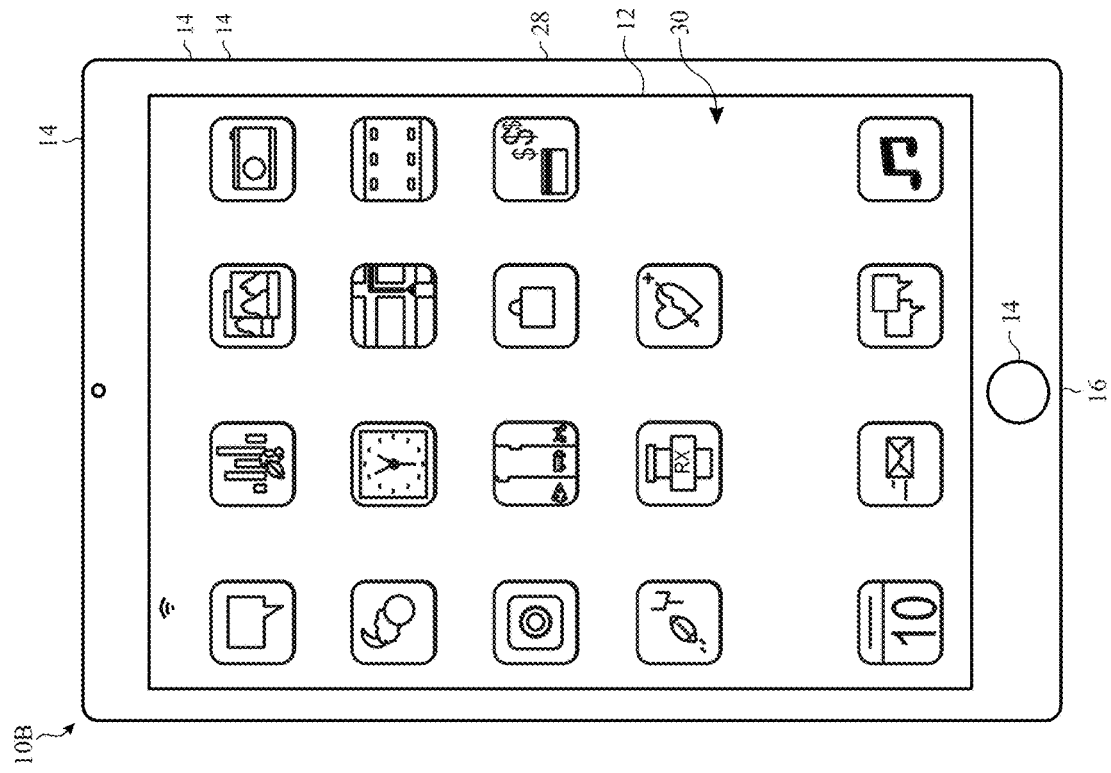
FIG. 3 is another example of the electronic device of FIG. 1, in accordance with an embodiment.
Figure 4:
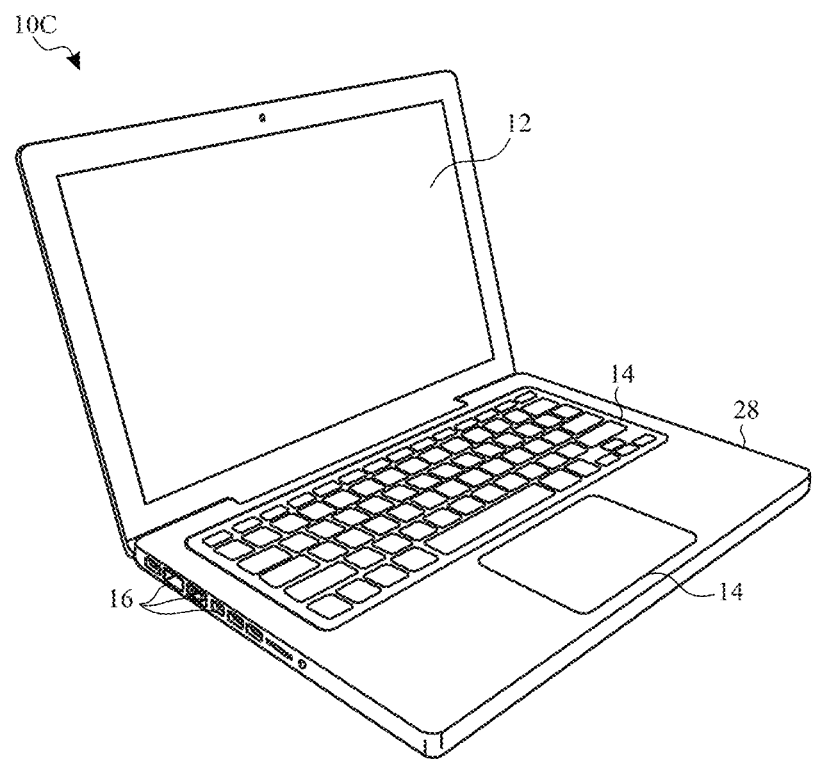
FIG. 4 is another example of the electronic device of FIG. 1, in accordance with an embodiment.
Figure 5:
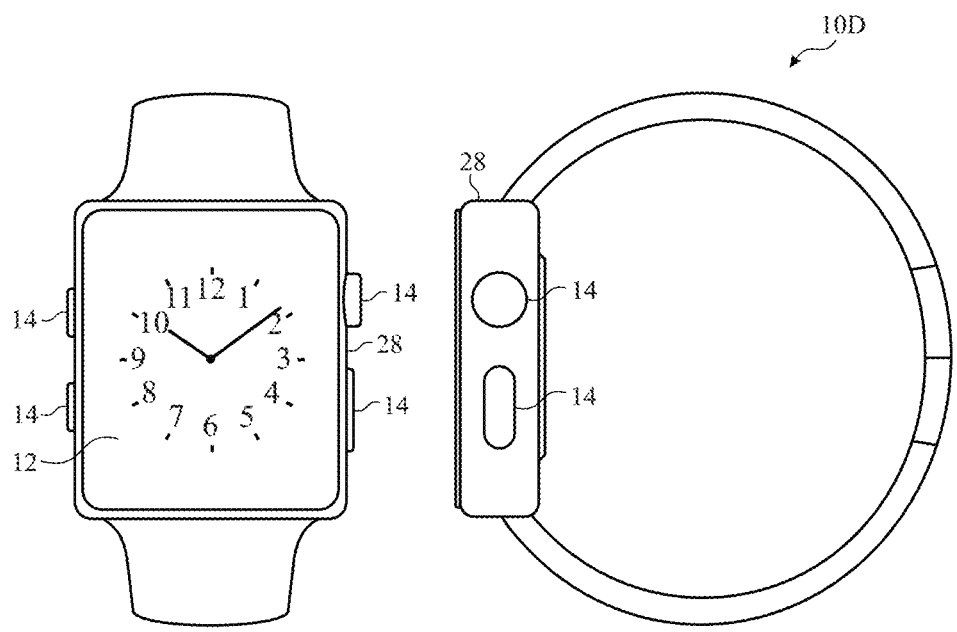
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a wearable electronic device 10D, is shown in FIG. 5. For illustrative purposes, the wearable electronic device 10D may be any Apple Watch® model available from Apple Inc. More generally, the wearable electronic device 10D may be any wearable electronic device such as, for example, a wearable exercise monitoring device (e.g., pedometer, accelerometer, heart rate monitor), or other device by another manufacturer. As depicted, the tablet device 10B, the computer 10C, and the wearable electronic device 10D each also includes an electronic display 12, input devices 14, I/O ports 16, and an enclosure 28.

As described above, the electronic display 12 may display images based at least in part on image data received, for example, from the processor core complex 18 and/or the image processing circuitry 27. Additionally, as described above, the image data may be processed before being used to display a corresponding image on the electronic display 12. In some embodiments, a display pipeline may process the image data, for example, to identify and/or compensate for cross-talk between the circuitry of the electronic device 10.

Figure 6:
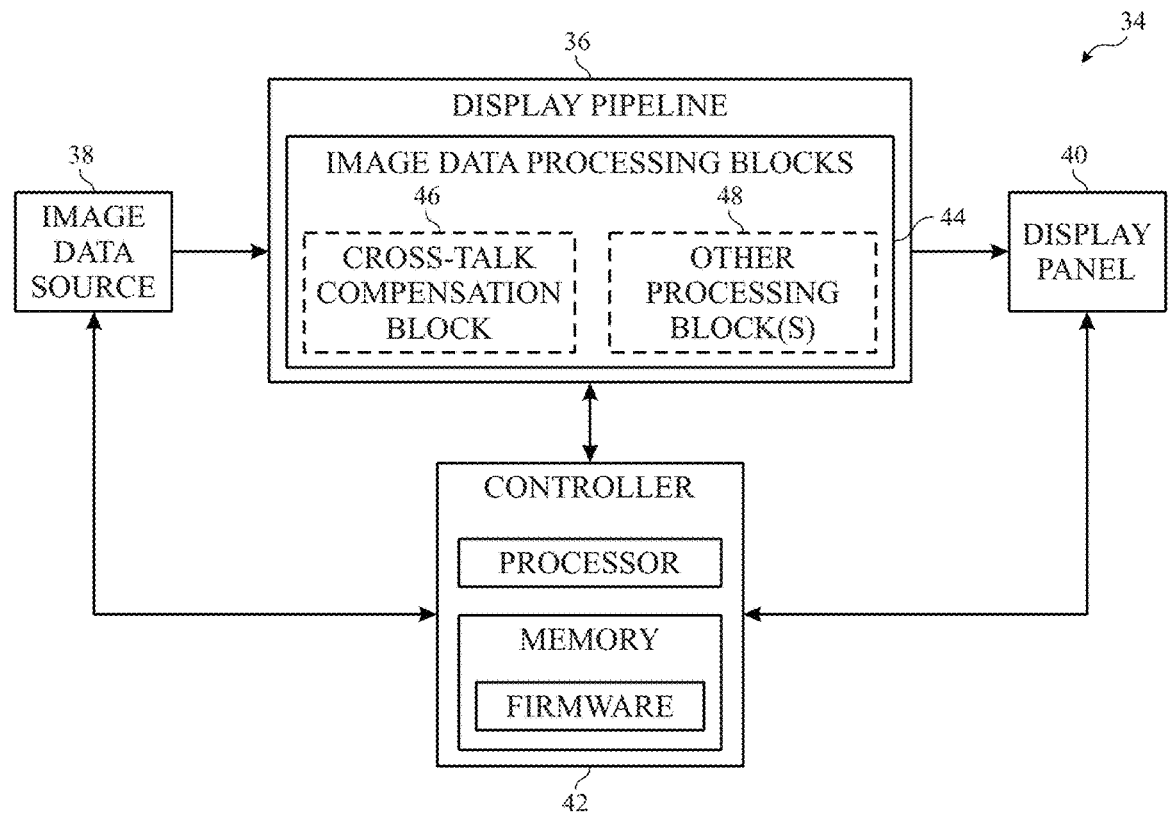
FIG. 6 is a block diagram of a portion of the electronic device of FIG. 1 including a display pipeline that has cross-talk compensation circuitry, in accordance with an embodiment.

To help illustrate, a portion 34 of the electronic device 10 including a display pipeline 36 is shown in FIG. 6. In some embodiments, the display pipeline 36 may be implemented by circuitry in the electronic device 10, circuitry in the electronic display 12, or a combination thereof. For example, the display pipeline 36 may be included in the processor core complex 18, the image processing circuitry 27, a timing controller (TCON) in the electronic display 12, a display driver of the electronic display, or any combination thereof.

The depicted portion 34 of the electronic device 10 also includes an image data source 38, a display panel 40, and a controller 42. In some embodiments, the display panel 40 of the electronic display 12 may include a light emitting diode (LED) display, organic light emitting diode (OLED) display, active-matrix organic light emitting diode (AMOLED) display, liquid crystal (LCD) display, or any other suitable type of display panel 40. In some embodiments, the controller 42 may control operation of the display pipeline 36, the image data source 38, and/or the display panel 40. To facilitate controlling operation, the controller 42 may include a controller processor and/or controller memory. In some embodiments, the controller processor may be included in the processor core complex 18, the image processing circuitry 27, a timing controller in the electronic display 12, a separate processing module, or any combination thereof and execute instructions stored in the controller memory. Additionally, in some embodiments, the controller memory may be included in the local memory 20, the main memory storage device 22, a separate tangible, non-transitory, computer readable medium, or any combination thereof.

In the depicted embodiment, the display pipeline 36 is communicatively coupled to the image data source 38. In this manner, the display pipeline 36 may receive input image data corresponding with an image to be displayed on the electronic display 12 from the image data source 38. The input image data may indicate target characteristics (e.g., pixel data of target luminance values) corresponding to a desired image using any suitable source format, such as an 8-bit fixed point αRGB format, a 10-bit fixed point αRGB format, a signed 16-bit floating point αRGB format, an 8-bit fixed point YCbCr format, a 10-bit fixed point YCbCr format, a 12-bit fixed point YCbCr format, and/or the like. In some embodiments, the image data source 38 may be included in the processor core complex 18, the image processing circuitry 27, or a combination thereof. Furthermore, the input image data may reside in a linear color space, a gamma-corrected color space, or any other suitable color space.

As described above, the display pipeline 36 may operate to process image data received from the image data source 38. The display pipeline 36 may include one or more image data processing blocks 44 (e.g., circuitry, modules, or processing stages) such as the cross-talk compensation block 46 and/or one or more other processing blocks 48. As should be appreciated, multiple image data processing blocks may be incorporated into the display pipeline 36, such as a color management block, a dither block, a burn-in compensation block, etc. Further, the functions (e.g., operations) performed by the display pipeline 36 may be divided or shared between various image data processing blocks and/or sub-blocks, and while the term "block" is used herein, there may or may not be a physical or logical separation between the image data processing blocks 48 and/or sub-blocks thereof.

After processing, the display pipeline 36 may output the image data to the display panel 40, and, based on the processed image data, the display panel 40 may apply analog electrical signals to the pixels of the electronic display 12 to cumulatively display one or more corresponding images. In this manner, the display pipeline 36 may facilitate providing visual representations of information on the electronic display 12. As should be appreciated, the display pipeline 36 may be implemented in dedicated circuitry and/or, in whole or in part, by executing instructions stored in a tangible non-transitory computer-readable medium, such as the controller memory, using processing circuitry, such as the controller processor.

Figure 7:
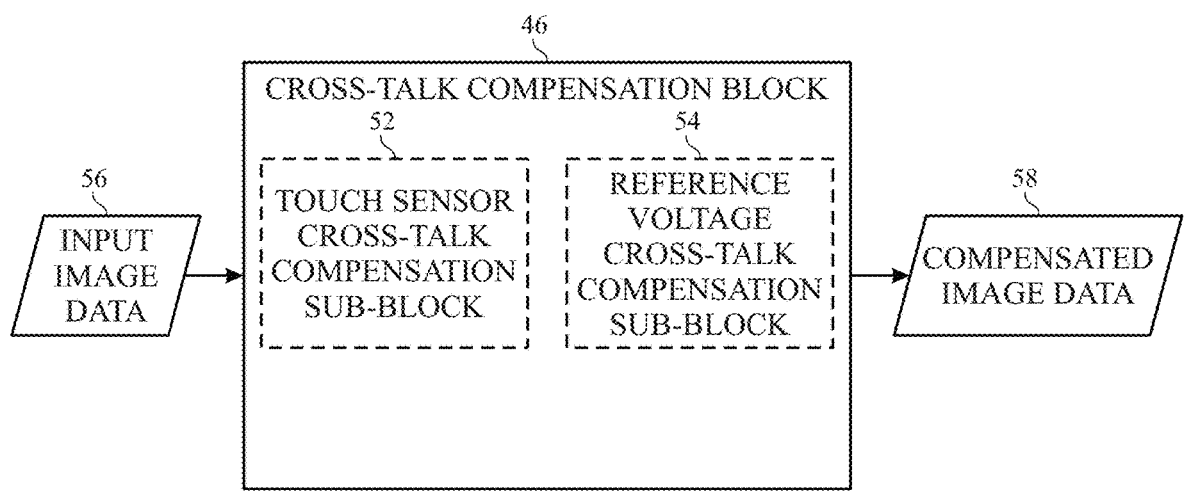
FIG. 7 is a block diagram of a portion of the display pipeline of FIG. 6 including the cross-talk compensation block, in accordance with an embodiment.

The cross-talk compensation block 46 may include a touch sensor cross-talk compensation sub-block 52 and a reference voltage cross-talk compensation sub-block 54, as shown in the block diagram of FIG. 7. The touch sensor cross-talk compensation sub-block 52 and the reference voltage cross-talk compensation sub-block 54 may assist in reducing the likelihood of perceivable artifacts such as banding and/or color/brightness inaccuracies that may be caused due to cross-talk between data lines of pixel circuitry and/or touch sensor circuitry. In general, the cross-talk compensation block 46 may receive input image data 56, generate compensated image data 58 via the touch sensor cross-talk compensation sub-block 52 and/or the reference voltage cross-talk compensation sub-block 54, and output the compensated image data 58 to the other processing blocks 48, the display panel 40, and/or the pixels. Moreover, in some embodiments, the touch sensor cross-talk compensation sub-block 52 and the reference voltage cross-talk compensation sub-block 54 may be implemented together (e.g., via a combined compensation), sequentially (e.g., a first compensation followed by a second compensation), or be implemented separately (e.g., the touch sensor cross-talk compensation sub-block 52 may be implemented without the reference voltage cross-talk compensation sub-block 54 and vice versa).

Figure 8:
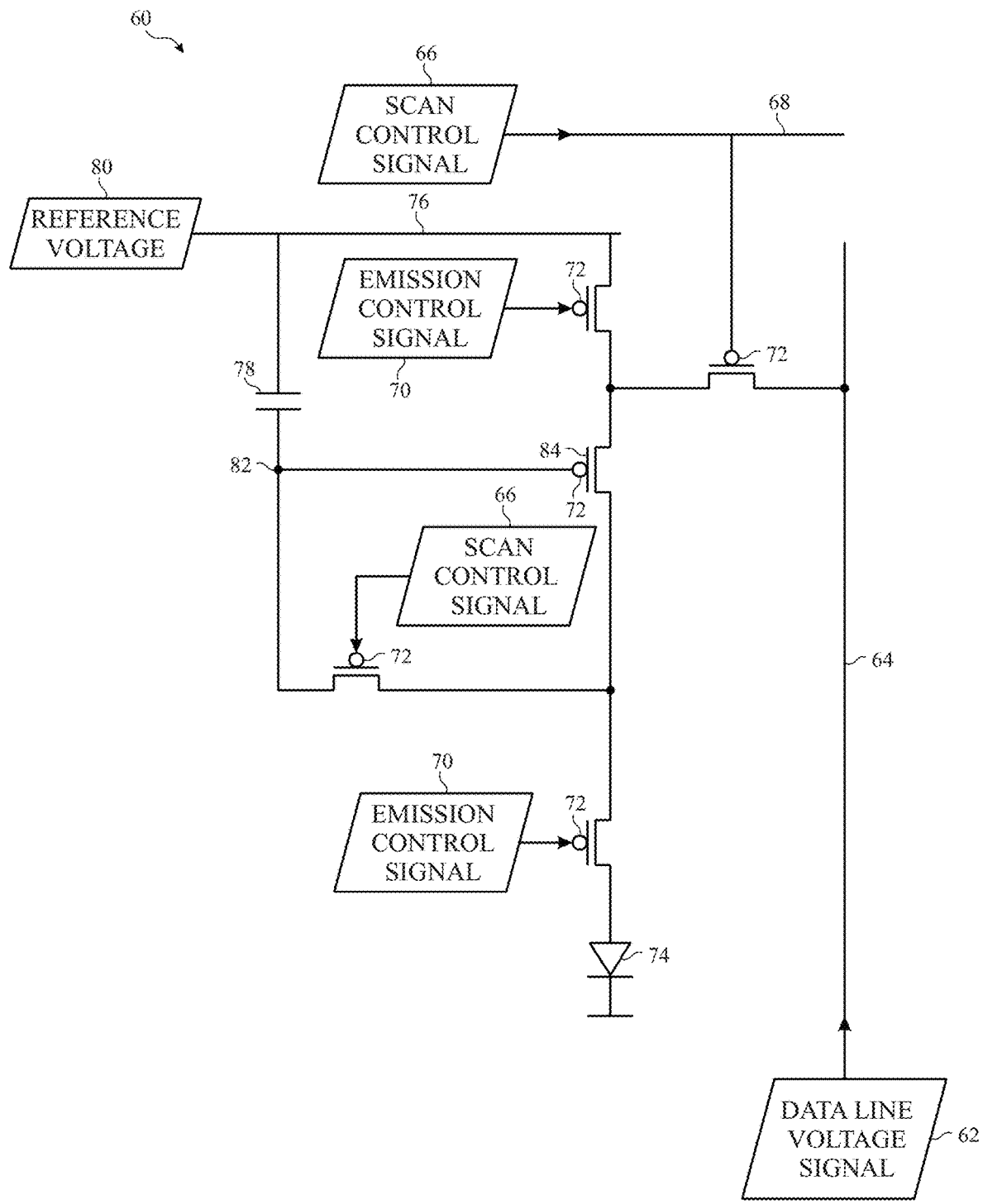
FIG. 8 is a schematic diagram of pixel circuitry, in accordance with an embodiment.

To help illustrate the effects on pixel circuitry 60 that are rectified by the cross-talk compensation block 46, FIG. 8 is a simplified schematic diagram of pixel circuitry 60. The pixel circuitry 60 may be controlled by a data line voltage signal 62 (e.g., on data line 64), a scan control signal 66 (e.g., on scan line 68), and/or an emission control signal 70. For example, the data line voltage signal 62 may be an analog voltage signal indicative of the compensated image data 58 (e.g., compensated pixel data of luminance values), and the scan control signal 66 may be a selection signal to access a specific pixel by operating one or more switching devices 72. Additionally, the emission control signal 70 may connect or disconnect a light emissive element 74 (e.g., an organic or micro light emitting diode) of the pixel circuitry 60 and/or a reference voltage supply line 76, for example, to disconnect the light emissive element 74 when a new data line voltage signal 62 is being written (e.g., programmed) to the pixel circuitry 60 and to connect the light emissive element 74 for illumination.

The switching devices 72 may be of any suitable type of electrical switch (e.g., p-type metal-oxide-semiconductor (PMOS) transistors, n-type metal-oxide-semiconductor (NMOS) transistors, etc.). In the depicted example, a storage capacitor 78 is coupled between the reference voltage supply line 76 (e.g., supplying the reference voltage 80) and an internal (e.g., current control) node 82. Additionally, the voltage at the internal node 82 may control a gate 84 of a switching device 72. The light emission from the light emissive element 74 may be varied based on the magnitude of electrical current supplied to the light emissive element 74, which may be controlled by the voltage at the internal node 82 applied to the gate 84. Moreover, the switching device 72 controlled by the gate 84 may be operated in its linear mode (e.g., region) such that its channel width and, thus, permitted current flow varies proportionally with the voltage of the internal node 82. Thus, to facilitate controlling light emission, the data line voltage signal 62 may be used to set the voltage at the internal node 82 and, therefore, regulate the current flow from the reference voltage supply line 76.

As one of ordinary skill would appreciate, deviations of the data line voltage signal 62 and/or the reference voltage 80 may change the luminance output of the light emissive element 74. As such, compensation for cross-talk that causes such deviations may assist in reducing visible artifacts.

Figure 9:
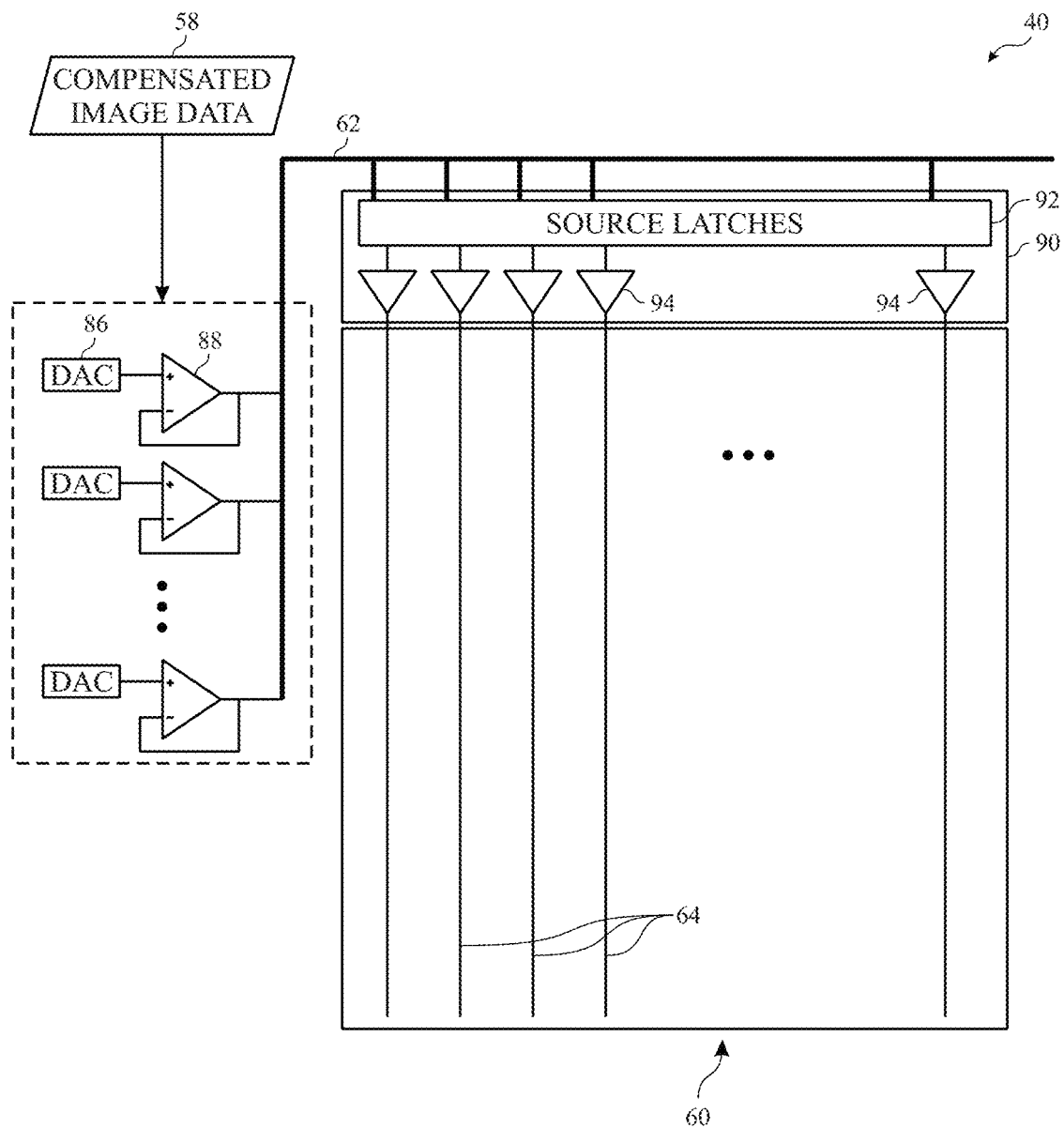
FIG. 9 is a schematic diagram of a portion of an electronic display, in accordance with an embodiment.

In further illustration, a schematic diagram of a portion of the display panel 40, including the data lines 64 to the pixel circuitry 60, is shown in FIG. 9. In some embodiments, the display panel 40 may use one or more digital to analog converters (DACs) 86 to convert the compensated image data 58, which may be digitally represented, into the data line voltage signals 62 to be supplied to the pixel circuitry 60. Moreover, in some embodiments, data line voltage signal output from the DACs 86 may be buffered by one or more buffers 88 (e.g., operational amplifiers), for example, to stabilize the signal under the current draw of the pixel circuitry 60 and/or column drivers 90. The display panel 40 may include column drivers 90, also known as data drivers and/or display drivers, including source latches 92, source amplifiers 94, and/or any other suitable logic/circuitry, to select the appropriate data line voltage signal 62 and apply the signal to the appropriate pixel circuitry 60 to achieve the target luminance output from the light emissive element 74.

Figure 10:
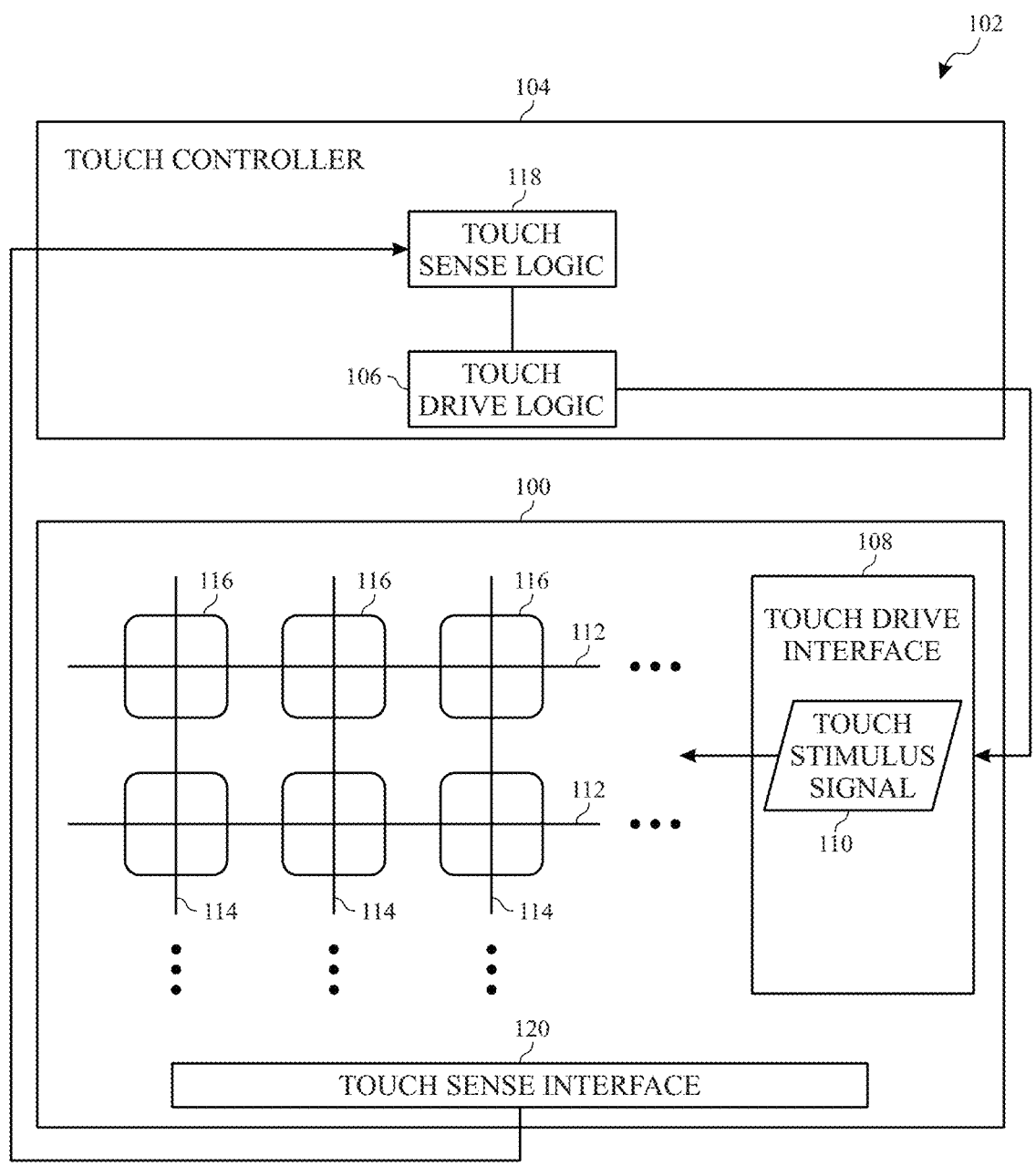
FIG. 10 is a schematic diagram of a portion of the electronic device including a touch sensor sub-system, in accordance with an embodiment.

As the data line voltage signals 62 are run to their corresponding pixel circuitry 60 in the display panel 40, touch sensor circuitry 100 may be closely layered on top of or integrated into the display panel 40 as part of a touch sensor sub-system 102, as illustrated in FIG. 10. In some embodiments, a touch controller 104 may generate (e.g., via touch drive logic 106 and/or a touch drive interface 108) a touch stimulus signal 110 via an array of touch drive electrodes 112. Touch sense electrodes 114 may form a grid of touch areas 116 (e.g., capacitive sensing nodes) with the touch drive electrodes 112 such that when an object, such as a finger, is located near the confluence of a given touch drive electrode 112 and a given touch sense electrode 114, touch sense logic (e.g., via a touch sense interface 120) may determine a placement of the object on the grid of touch areas 116. It should be noted that the terms "lines" and "electrodes" as used herein simply refers to conductive pathways, and is not intended to be limited to structures that are strictly linear. Rather, the terms "lines" and "electrodes" may encompass pathways that change direction, are of different size, shape, materials, and/or span multiple regions.

In general, a finger or object may disrupt the electromagnetic fields of the touch stimulus signal 110 in the touch area(s) 116 that the touch occurs. The change in the electromagnetic fields may be registered by the touch sense interface 120 via the touch sense electrodes 114 and processed via the touch sense logic 118. The touch controller 104 may communicate an occurrence and/or position of user touches or hovers to the processor core complex 18, and the touch may be correlated to what is displayed on the electronic display 12.

Figure 11:
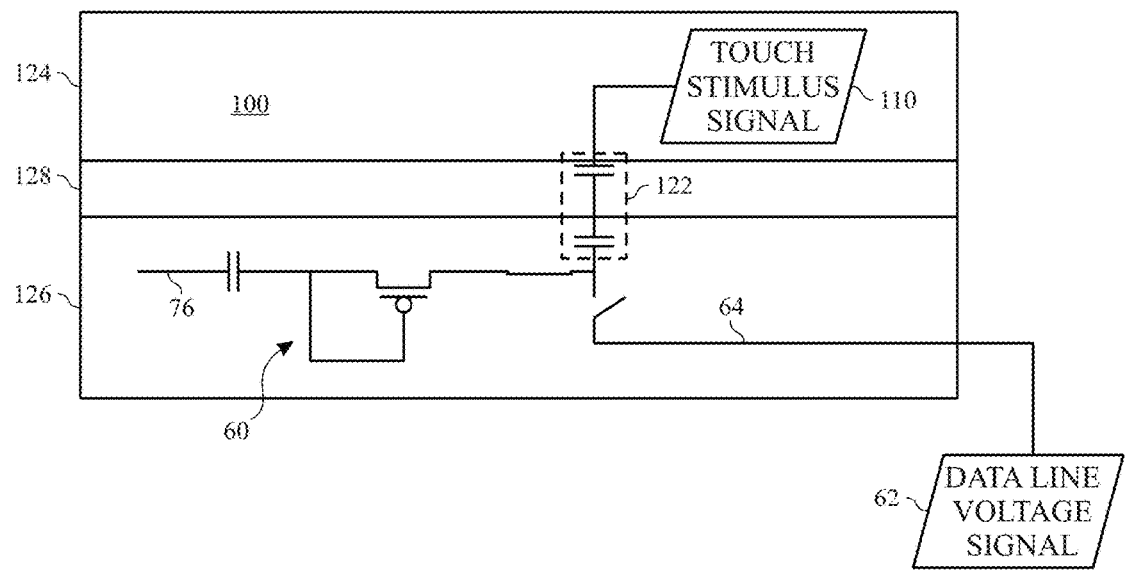
FIG. 11 is a schematic diagram of cross-talk between a touch layer and a display layer of the electronic device, in accordance with an embodiment.

As electronic devices get smaller, the cross-talk between the touch sensor circuitry 100 (e.g., the touch stimulus signal on the touch drive electrodes 112) and the pixel circuitry 60 may cause noticeable artifacts in the luminance output of the light emissive elements 74. Additionally, increased magnitude of the touch stimulus signal, while possibly providing increased fidelity and/or functionality (e.g., multi-touch sensing), may increase the cross-talk with the pixel circuitry 60. FIG. 11 is a schematic diagram of touch sensor circuitry 100, pixel circuitry 60, and cross-talk 122 between them. In some embodiments, a touch layer 124 of the touch sensor circuitry 100 may be directly adjacent a display layer 126 of the pixel circuitry 60. Alternatively, an intermediate layer 128 of material or circuitry may exist between the touch layer 124 and the display layer 126.

In one embodiment, the cross-talk 122 may occur between the touch drive electrodes 112 and the data lines 64 causing deviations in the data line voltage signals 62. Although illustrated as a capacitive cross-talk, it should be appreciated that the cross-talk may be of any type of electromagnetic interference. To reduce or eliminate perceivable effects of the cross-talk 122, the touch sensor cross-talk compensation sub-block 52 may compensate the input image data 56 such that the data line voltage signal 62 is adjusted to obtain the desired voltage at the internal node 82 controlling the gate 84 to supply the desired current to the light emissive element 74.

Figure 12:
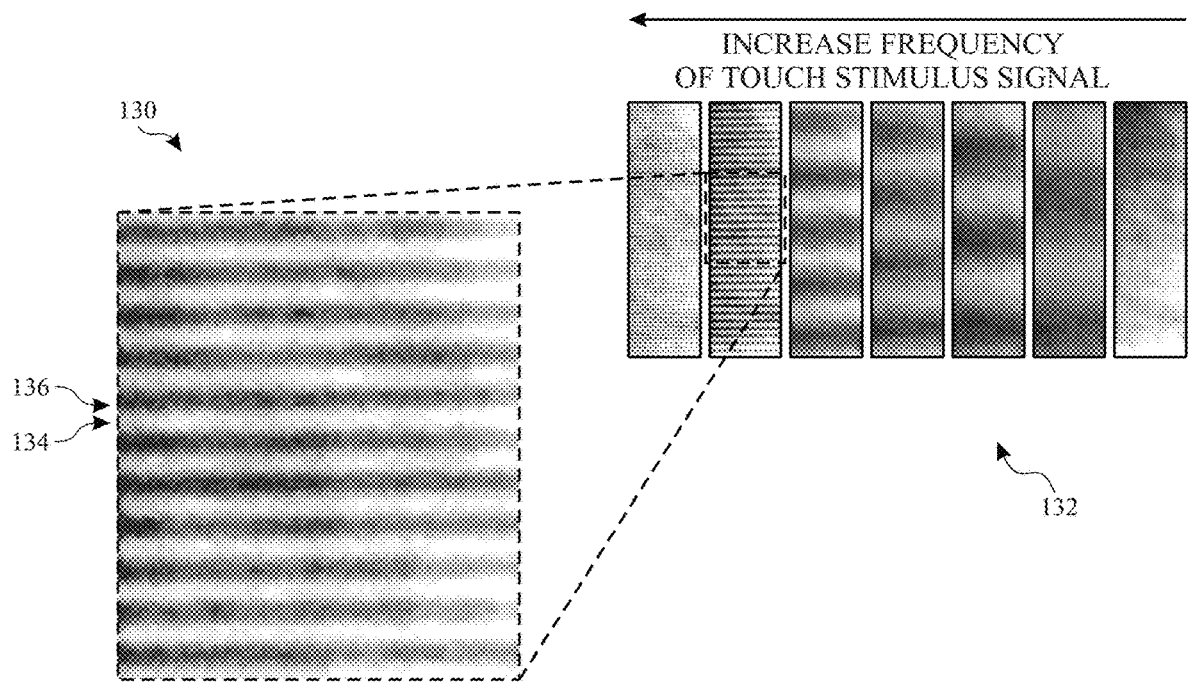
FIG. 12 is a depiction of visual artifacts on an electronic display such as banded patterns, in accordance with an embodiment.

The touch drive logic 106 and/or touch drive interface 108 may generate and transmit the touch stimulus signal 110 to the touch drive electrodes 112. Depending on the frequency of the touch stimulus signal 110, the cross-talk 122 may manifest differently at different locations in the display layer 126. In some embodiments, the cross-talk 122 from the touch layer 124 to the display layer 126 may result in a banded pattern 130 across the electronic display 12, which may be dependent upon the frequency of the touch stimulus signal 110, as depicted in FIG. 12. FIG. 12 includes a sampling 132 of banded patterns 130 at different frequencies of the touch stimulus signal 110. The banded pattern 130 may include portions of the electronic display 12 that have increased luminance 134 and portions of the electronic display 12 that have decreased luminance 136. Moreover, the magnitude of the increase and/or the decrease in luminance may trend with the magnitude of the touch stimulus signal 110. Furthermore, the spatial frequency of the banded pattern 130 may vary based on the frequency of the touch stimulus signal 110.

In some embodiments, the touch sensor cross-talk compensation sub-block 52 may determine and apply a compensation to decrease the luminance of pixels in portions of the electronic display 12 that would otherwise have increased luminance 134 due to the cross-talk and increase the luminance of pixels in portions of the electronic display 12 that would otherwise have decreased luminance 136 due to the cross-talk. Spatially the touch sensor cross-talk compensation sub-block 52 may compensate the pixels of the electronic display with the inverse equivalent of the banded pattern 130 at the spatial frequency determined by the time frequency of the touch stimulus signal 110.

Figure 13:
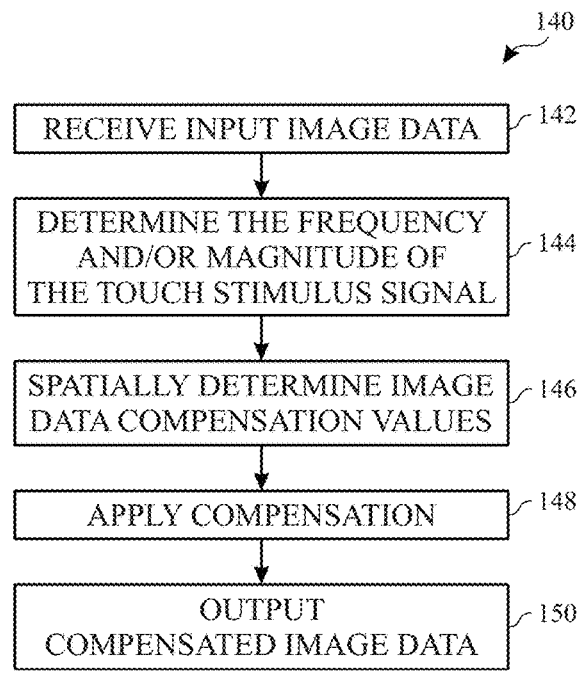
FIG. 13 is a flowchart of an example process for compensating image data for touch sensor cross-talk, in accordance with an embodiment.

FIG. 13 is a flowchart 140 of an example process for compensating image data for touch sensor cross-talk 122. The process may include receiving, for example via the cross-talk compensation block 46, input image data 56 (process block 142). The touch sensor cross-talk compensation sub-block 52 of the cross-talk compensation block 46 may determine the frequency and/or magnitude of the touch stimulus signal 110 (process block 144), and, based on the determined frequency and/or magnitude, spatially determine image data compensation values for the pixels of the electronic display 12 (process block 146). The touch sensor cross-talk compensation sub-block 52 may also apply the compensation to the input image data 56 (process block 148) and output the compensated image data 58 (process block 150).

Figure 14:
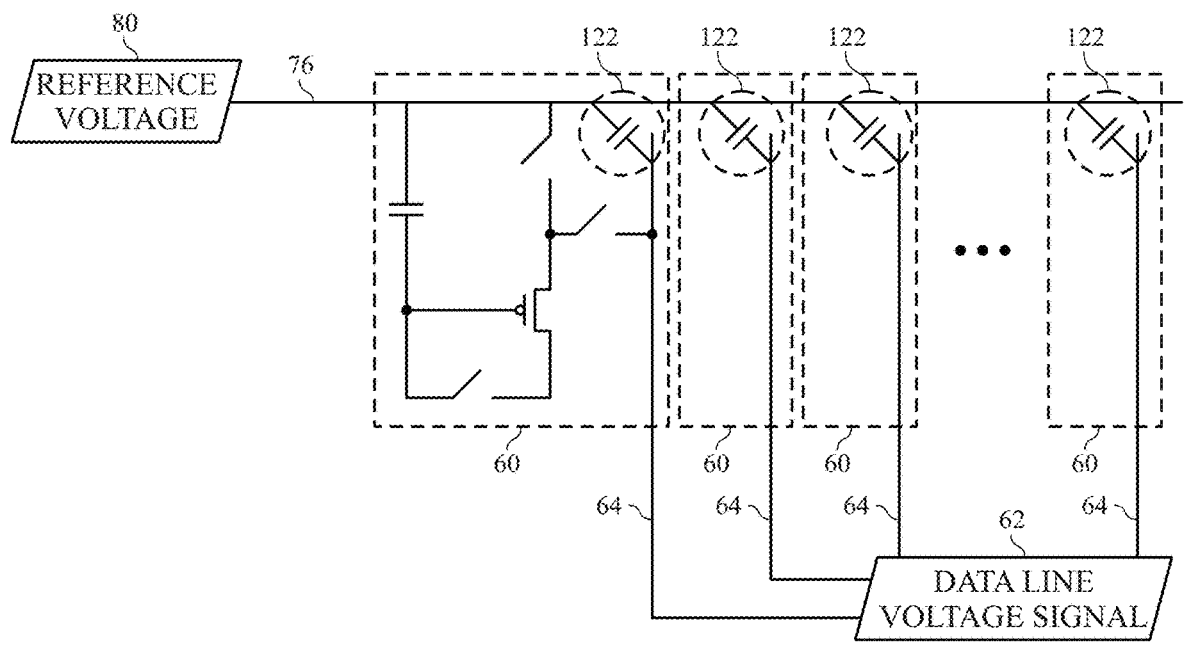
FIG. 14 is a schematic diagram of cross-talk between electrodes of pixel circuitry, in accordance with an embodiment.
Figure 15:
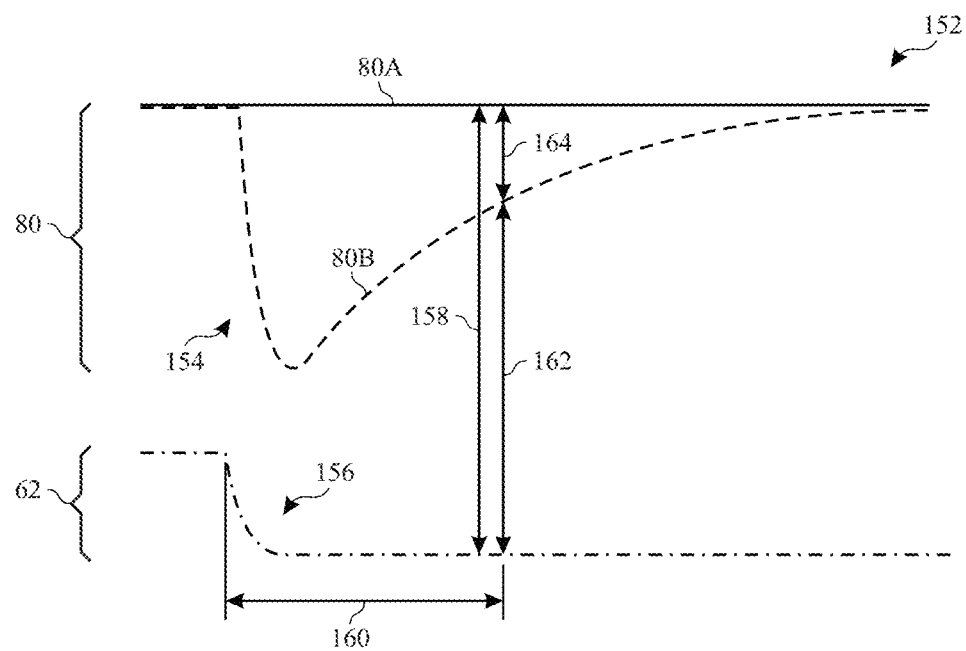
FIG. 15 is a graph of a reference voltage reaction to a change in a data line voltage signal, in accordance with an embodiment.

Additionally or alternatively, cross-talk 122 may also occur within the pixel circuitry 60, as illustrated in FIG. 14. In some embodiments, pixels may be updated with new data (e.g., for a new frame) by row. For example, multiple pixels in a column may share the same data line 64, and in some embodiments, the pixels may be activated by row (e.g., via the scan control signal 66). However, cross-talk 122 may exist between the reference voltage supply line 76 and the data line 64. When a first row is deactivated, and a second subsequent row is activated, the change in data line voltage signal 62 from the signal of a first pixel in the first row to the signal of a corresponding pixel in the second row may cause fluctuations in the reference voltage 80 on the reference voltage supply line 76 due to the cross-talk 122, as shown in the graph 152 of FIG. 15. As such, larger changes in the data line voltage signal 62 may lead to larger deviations of the reference voltage 80. The graph 152 illustrates the reaction 154 of the affected reference voltage 80B to the change 156 in data line voltage signal 62 as compared to the ideal reference voltage 80A. The intended voltage difference 158 between the data line voltage signal 62 and the ideal reference voltage 80A may yield the desired luminance from the light emissive element 74, but during the programming period 160 of the pixel, the affected reference voltage 80B may not have time to settle before the programming period 160 ends. As such, the pixel may be provided a programmed voltage difference 162 that deviates from the intended voltage difference 158 with some amount of error 164. In some scenarios, increased refresh rates (e.g., shorter programming periods 160) and/or higher density display panels 40 (e.g., higher resolution and/or smaller display panels 40 that may increase the magnitude of the cross-talk) may induce increased amounts of error 164. As such, the compensation for such error may allow for increased refresh rates and higher resolution displays with reduced likelihood of visual artifacts.

Figure 16:
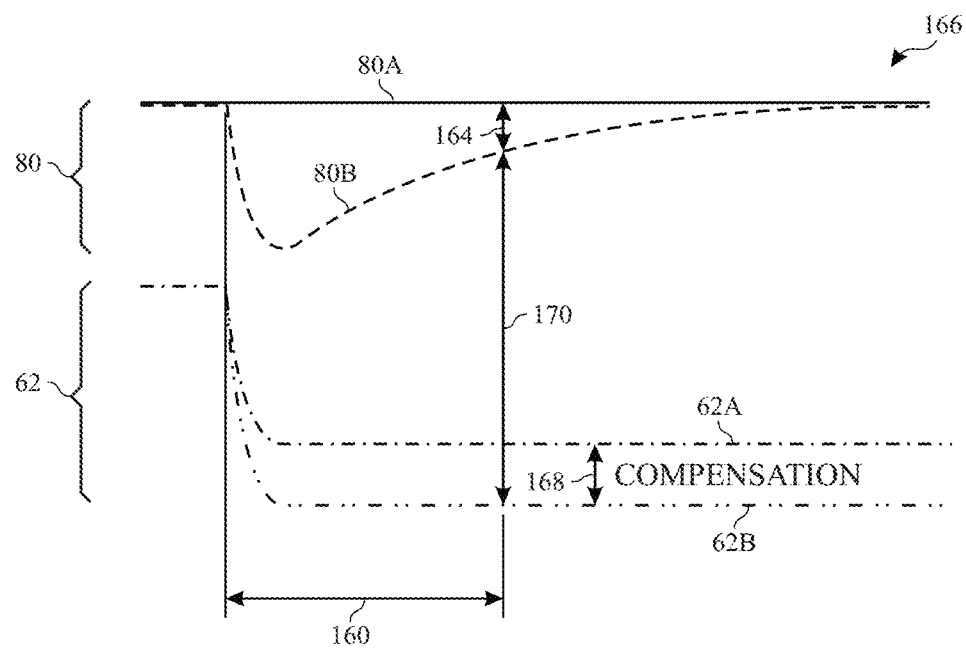
FIG. 16 is a graph of a data line voltage signal compensated for the reference voltage reaction, in accordance with an embodiment.

FIG. 16 is a graph 166 of the uncompensated data line voltage signal 62A and the compensated data line voltage signal 62B relative to the ideal reference voltage 80A and the affected reference voltage 80B. In the depicted embodiment, the compensated data line voltage signal 62B has been decreased by a compensation amount 168 approximately equal to the error 164. As such, at the end of the programming period 160, the compensated voltage difference 170 is approximately equal to the intended voltage difference 158, such that the likelihood of visual artifacts due to the cross-talk 122 is reduced or eliminated.

As discussed above, the deviation in the reference voltage 80 due to cross-talk 122 with the data line 64 may vary based on the change in data line voltage signal 62 from the access of one row to the next. Furthermore, as depicted in FIG. 14, multiple data lines 64 may exhibit cross-talk with a single reference voltage supply line 76. As such, the sharing of a reference voltage supply line 76 amongst multiple pixels may cause the reaction 154 of the reference voltage 80 to depend, at least partially, on the aggregate of the content transitions (e.g., changes in data line voltage signal 62) for a given row. Accordingly, in one embodiment, the reference voltage cross-talk compensation sub-block 54 may determine a difference between the previous data line voltage signal 62 (e.g., for a corresponding pixel in the same column and a previous row) and a current data line voltage signal 62 for each pixel of the current row and aggregate the changes. For example, if a first data line voltage signal 62 decreased, and a second data line voltage signal 62 increased, the variations in the reference voltage 80 due to cross-talk with the first and second data line voltage signals 62 may, at least partially, cancel. Moreover, in some embodiments the estimated error 164 for a given pixel may be determined by aggregation of the individual errors in reference voltage 80 caused by each change in the data line voltage signals 62 on the same row of the given pixel. Furthermore, in some embodiments, the estimated error for the given pixel may be determined by aggregating the individual errors in reference voltage 80 caused by the transitions (e.g., from content of a previous row to the current row) of other pixels in the proximity of the given pixel. For example, the individual errors in reference voltage 80 may be spatially averaged, such that transitions causing error in the reference voltage 80 occurring closer to the given pixel are weighted more heavily than transitions further from the given pixel. Additionally or alternatively, the data line voltage signal changes 156 may be aggregated via a spatial average and used to determine the estimated error 164.

As discussed above, the transition from one row to the next may cause changes in the data line voltage signals 62, which, in turn, may cause error in the reference voltage 80 due to the cross-talk 122. Furthermore, in some embodiments, some rows (e.g., the first row of the electronic display 12) may not have a specific transition from a previous row. As such, to estimate the error in the reference voltage 80, the reference voltage cross-talk compensation sub-block 54 may utilize a preset data line parking voltage as the previous data line voltage signal 62 to determine the change 156 in the data line voltage signal 62.

In some embodiments, the changes in the reference voltage 80 due to changes in the data line voltage signal 62 may be determined via calibration using a set of test images to determine a mapping from the change in data line voltage signal 62 to the estimated change in reference voltage 80. During compensation, the mapping may be implemented via an estimation equation or via a look-up-table. Using the mapping, the reference voltage cross-talk compensation sub-block 54 may estimate the error induced in the reference voltage 80 from each pixel transition and compute the total error for a given pixel by accumulating (e.g., via spatial averaging) the error induced by the pixels in proximity to the given pixel. Furthermore, in some embodiments, a threshold may be set such that changes 156 and/or a spatial average of multiple changes 156 less than the threshold are ignored. For example, changes 156 less than the threshold may be likely to not result in perceivable artifacts. As such, changes 156 less than the threshold may not be compensated, which may increase available bandwidth in the display pipeline 36.

Figure 17:
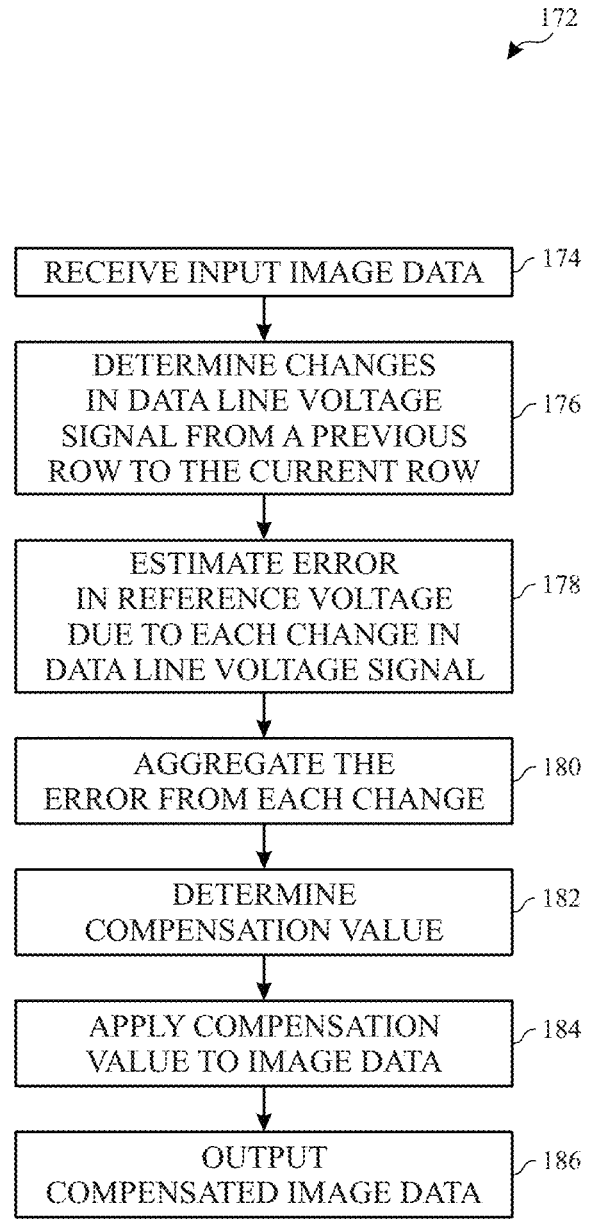
FIG. 17 is a flowchart of an example process for compensating for cross-talk between a reference voltage supply line and data lines of the pixel circuitry, in accordance with an embodiment.

FIG. 17 is a flowchart 172 of an example process for compensating for cross-talk 122 between the reference voltage supply line 76 and the data lines 64. The process may include receiving, for example via the reference voltage cross-talk compensation sub-block 54, input image data 56 (process block 174) and determining changes in the data line voltage signal 62 from a previous row of pixels of the display panel 40 to the current row (process block 176). The reference voltage cross-talk compensation sub-block 54 may also estimate the error in the reference voltage 80 due to each change in the data line voltage signal 62 (process block 178). The error from each change in data line voltage signal 62 may be aggregated (process block 180). For example, the total error for a given pixel may be a spatial average of the errors from each change in data line voltage signals 62 in proximity to the given pixel. The reference voltage cross-talk compensation sub-block 54 may determine the compensation value (process block 182), for example based on the estimated error in the reference voltage 80 at each pixel. The compensation value may then be applied to the image data (process block 184) and the compensated image data 58 may be output (process block 186).

As discussed herein, by compensating for the cross-talk 122 between components of the pixel circuitry 60 and between the display layer 126 and the touch layer 124, an electronic display may include a higher density of pixels (e.g., higher resolution), a faster refresh rate, a small form factor when layered with touch sensor circuitry 100, increased magnitude of a touch stimulus signal 110 (e.g., for increased fidelity/functionality of a touch sensor sub-system 102), and exhibit a reduced likelihood of visual artifacts. Moreover, although the above referenced flowcharts 140 and 172 are shown in a given order, in certain embodiments, process blocks may be reordered, altered, deleted, and/or occur simultaneously. Additionally, the referenced flowcharts 140 and 172 are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display comprising pixel circuitry and configured to display an image based at least in part on compensated image data; and
image processing circuitry configured to compensate input image data for voltage variations within the pixel circuitry of a plurality of pixels of the electronic display, wherein the image processing circuitry comprises:
touch cross-talk compensation circuitry configured to generate a first compensation value to compensate the input image data for a first cross-talk causing, at least in part, the voltage variations, wherein the first cross-talk comprises a first electromagnetic coupling between a first electrode of touch sensor circuitry and a second electrode of the pixel circuitry, and wherein the image processing circuitry is configured to generate the compensated image data based at least in part on the first compensation value; or
reference voltage cross-talk compensation circuitry configured to generate a second compensation value to compensate the input image data for a second cross-talk causing, at least in part, the voltage variations, wherein the second cross-talk comprises a second electromagnetic coupling between a third electrode of the pixel circuitry and the second electrode, and wherein the image processing circuitry is configured to generate the compensated image data based at least in part on the second compensation value.

2. The electronic device of claim 1, wherein the first cross-talk comprises a change in a data line voltage signal of the second electrode based at least in part on a touch stimulus signal on the first electrode.

3. The electronic device of claim 2, wherein the first compensation value is generated based at least in part on a frequency of the touch stimulus signal.

4. The electronic device of claim 1, wherein the first compensation value for a given pixel of the plurality of pixels is generated based at least in part on a location of the given pixel on the electronic display.

5. The electronic device of claim 1, wherein the second cross-talk comprises a first change in a reference voltage of the third electrode in response to a second change in a data line voltage signal of the second electrode.

6. The electronic device of claim 1, wherein the reference voltage cross-talk compensation circuitry is configured to estimate an error in a reference voltage of the third electrode based at least in part on a change in voltage of the second electrode during a transition from programming of a first row of the electronic display to programming of a second row of the electronic display.

7. The electronic device of claim 1, wherein the reference voltage cross-talk compensation circuitry is configured to estimate an error in a reference voltage of the third electrode for a given pixel based at least in part on an aggregate of a plurality of individual errors associated with a row of pixels of the plurality of pixels.

8. The electronic device of claim 7, wherein the aggregate comprises a spatial average of the plurality of individual errors about the given pixel.

9. The electronic device of claim 1, wherein the reference voltage cross-talk compensation circuitry is configured to estimate an error in a reference voltage of the third electrode based at least in part by referencing a look-up-table configured to map a difference between a first data line voltage signal of the second electrode during programming of a first pixel of the plurality of pixels and a second data line voltage signal of the second electrode during programming of a second pixel of the plurality of pixels to the error.

* * * * *